United States Patent [19]

Miyata et al.

[11] Patent Number: 4,693,332

[45] Date of Patent: Sep. 15, 1987

[54] ELECTRIC CONTROL APPARATUS FOR POWER STEERING SYSTEM

[75] Inventors: Hiroshi Miyata; Shinji Katoh, both of Toyota, Japan

[73] Assignee: Toyota Jidosha Kabushiki Kaisha, Toyota, Japan

[21] Appl. No.: 767,508

[22] Filed: Aug. 20, 1985

[30] Foreign Application Priority Data

Aug. 20, 1984 [JP] Japan .............................. 59-173546

[51] Int. Cl.$^4$ .............................................. B62D 5/08
[52] U.S. Cl. ..................................... 180/142; 180/141
[58] Field of Search ............... 180/142, 141, 143, 132; 74/388 PS; 364/424

[56] References Cited

U.S. PATENT DOCUMENTS

| | | | |
|---|---|---|---|
| 4,300,650 | 11/1981 | Weber | 180/142 |
| 4,473,128 | 9/1984 | Nakayama et al. | 180/142 |
| 4,476,529 | 10/1984 | Nakamura et al. | 180/142 |
| 4,518,055 | 5/1985 | Yagi et al. | 180/142 |

*Primary Examiner*—John J. Love
*Assistant Examiner*—Donn McGiehan

*Attorney, Agent, or Firm*—Cushman, Darby & Cushman

[57] ABSTRACT

In a power-assisted steering system including an electrically operated bypass valve mounted on a hydraulic power cylinder and disposed within a bypass passage between opposite fluid chambers of the cylinder to permit bypass flow passing therethrough in its energized condition, an electric control apparatus includes a first sensor arranged to detect a travel speed of the vehicle for producing a first electric signal indicative of the vehicle speed, a second sensor arranged to detect a rotation speed of a prime mover of the vehicle for producing a second electric signal indicative of the rotation speed of the prime mover, a microcomputer responsive to the first and second electric signals for determining an optimum steering effort in relation to each value of the electric signals on a bais of predetermined respective functions of the vehicle speed and the rotation speed of the prime mover and for producing an electric control signal indicative of the optimum steering effort. The bypass valve is energized by the electric control signal applied thereto from the computer to control the opening degree of the bypass passage in accordance with the value of the electric control signal.

7 Claims, 18 Drawing Figures

VEHICLE SPEED

Fig. 7B

ROTATION SPEED OF PRIME MOVER

Fig. 8A

VEHICLE SPEED

Fig. 8B

ROTATION SPEED OF PRIME MOVER

TRAVEL ROAD (IDEAL CONTROL)

Fig.13

TRAVEL ROAD (CONTROL UNDER THE INVENTION)

Fig.14

TRAVEL ROAD (CONTROL UNDER VEHICLE SPEED RESPONSE)

Fig. 15

TRAVEL ROAD (CONTROL UNDER INTAKE AIR RESPONSE)

Fig. 16

TRAVEL ROAD (CONTROL UNDER ROTATION SPEED RESPONSE)

ELECTRIC CONTROL APPARATUS FOR POWER STEERING SYSTEM

BACKGROUND OF THE INVENTION

The present invention relates to a power-assisted steering system in a wheeled vehicle capable of effecting the driver's steering effort in accordance with the driving condition of the vehicle, and more particularly to an improvement of a power-assisted steering system of the type which comprises a servo valve associated with a hydraulic power cylinder to interconnect a hydraulic pressure source and the power cylinder and being responsive to rotary motion of a steering shaft to selectively direct the flow of fluid under pressure from the pressure source to one of opposite fluid chambers of the power cylinder and to permit the flow of fluid from the other fluid chamber to a fluid reservoir, thereby to effect reciprocating movement of a power piston in the cylinder, and an electrically operated bypass valve disposed within a bypass passage to permit bypass flow of fluid passing therethrough between the pressure source and the fluid reservoir in its energized condition.

In such a conventional power-assisted steering system as described above, the bypass valve is deenergized to effect a sufficient hydraulic power assist during low speed travel of the vehicle so as to lighten the driver's steering effort and is energized to decrease the hydraulic power assist during medium of high speed travel of the vehicle so as to increase the driver's steering effort, for stability in turning maneuvers. For such control of the bypass valve, there have been proposed power-assisted steering systems of the vehicle speed responsive type and of the engine rotation responsive type. In these power assisted steering systems, however, it is desireable to control the hydraulic power assist in response to deceleration and shifting operation of the power transmission during cornering travel of the vehicle. This results in unstable turning maneuver during cornering travel of the vehicle at a high speed or on a descending road.

Figure 9:
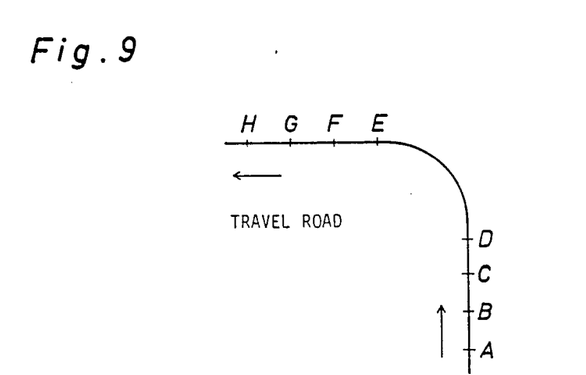
FIG. 9 illustrates a curved travel road.
Figure 10:
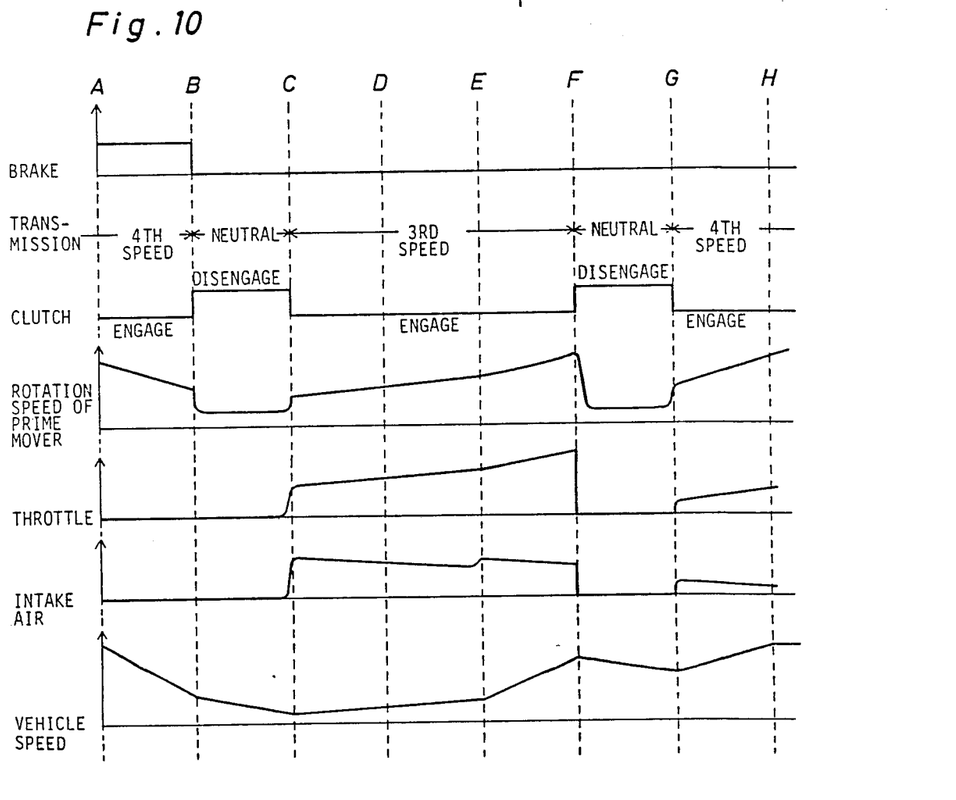
FIGS. 10 and 11 illustrate variation of a rotation speed of a prime mover, an opening degree of a throttle, an amount of intake air, and a vehicle speed in relation to the driver's operation during cornering travel of the vehicle on the road shown in FIG. 9.
Figure 11:
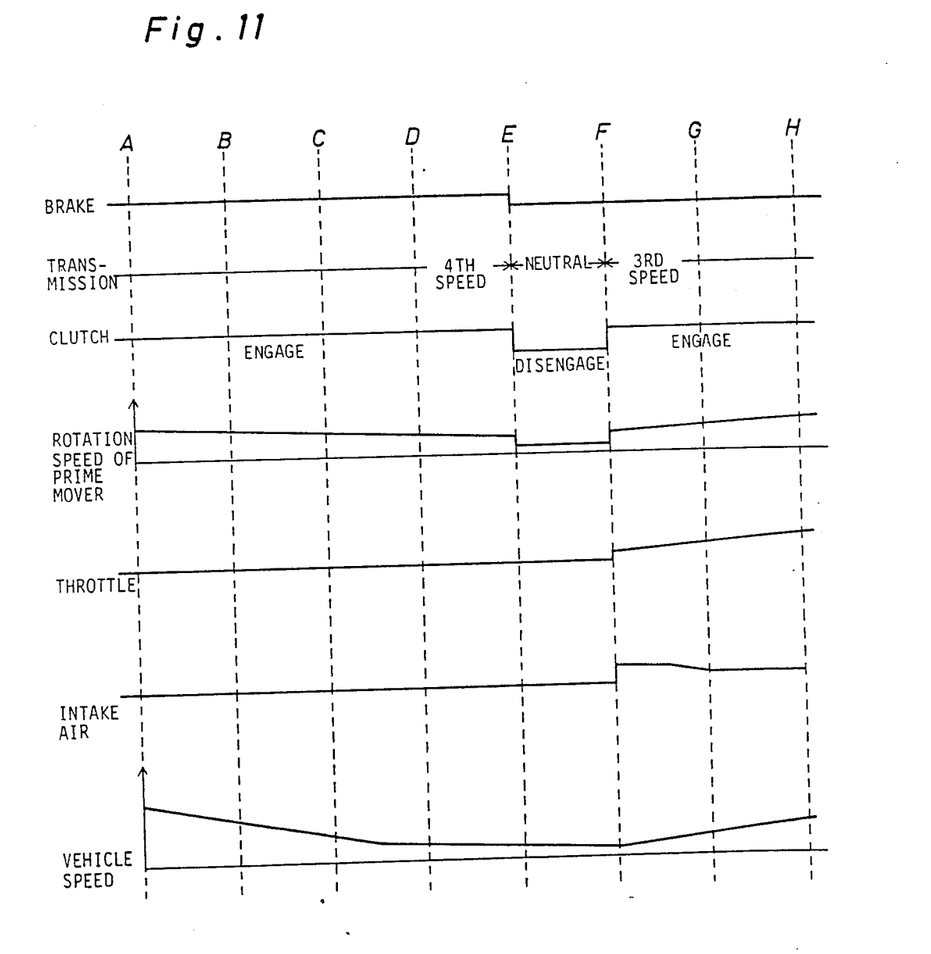

In FIG. 9, there is illustrated such a cornering travel path of the vehicle for passing through a curve D-E on a travel road. Assuming that a vehicle equipped with a manual transmission is operated to pass through the curve D-E, a skilled driver will conduct operation of the vehicle as shown in FIG. 10 to pass through the curve D-E at a high speed, while an unskilled driver will conduct operations of the vehicle as shown in FIG. 11 to pass through the curve D-E at a low speed. In the operation of FIG. 10, the brake pedal is depressed at a point A of the road to decelerate the vehicle, the clutch pedal is depressed at a point B to conduct shift-down operation from 4th speed to the 3rd speed, the accelerator pedal is depressed at a region between C-F to conduct cornering travel of the vehicle while in 3rd speed, and subsequently the clutch pedal is depressed at the point F to conduct shift-up operation from the 3rd speed to the 4th speed so as to conduct straight travel of the vehicle in 4th speed from a point G. During such operation, variation of the rotation speed (n) of the prime mover, the throttle opening degree ($\theta$), the amount of intake air ($\theta/n$) and the vehicle speed (V) will occur as shown in the figure. In the operation of FIG. 11, the brake pedal is depressed at the point E to decelerate the vehicle, and simultaneously the clutch pedal is depressed to conduct shift-down operation from the 4th speed to the 3rd speed. During such cornering travel of the vehicle, variation of the rotation speed (n) of the prime mover, the throttle opening degree ($\theta$), the amount of intake air ($\theta/n$) and the vehicle speed (V) will occur in the figure.

Figure 12:
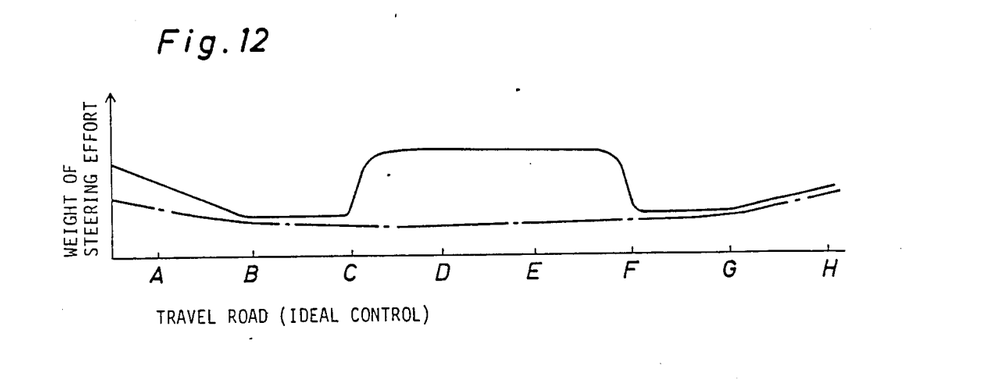
FIG. 12 is a graph illustrating an ideal control of the driver's steering effort during cornering travel of the vehicle.
Figure 14:
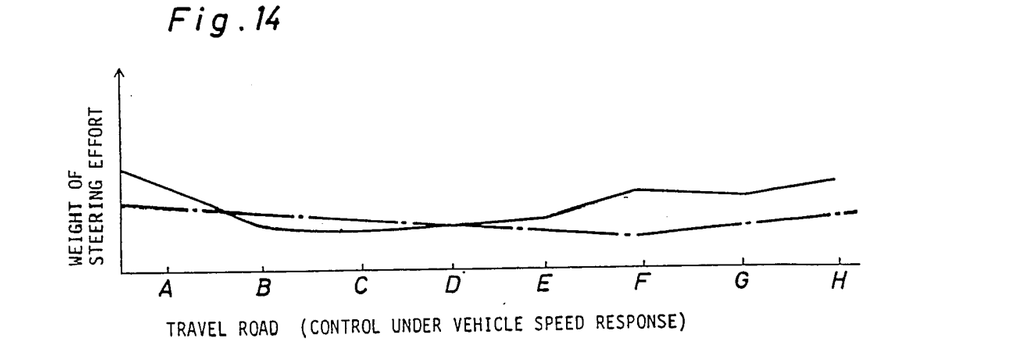
FIG. 14 is a graph illustrating a control of the driver's steering effort in a power-assisted steering system of the vehicle speed responsive type.
Figure 15:
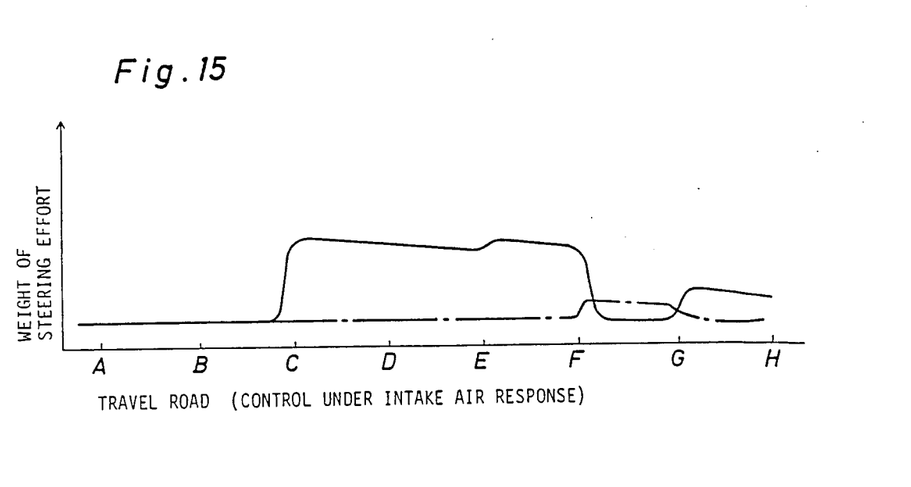
FIG. 15 is a graph illustrating a control of the driver's steering effort in a power-assisted steering system of the intake air responsive type.
Figure 16:
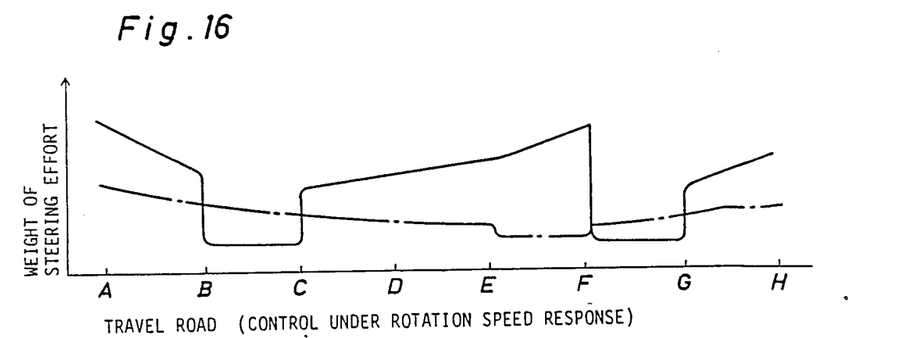
FIG. 16 is a graph illustrating a control of the driver's steering effort in a power-assisted steering system of the rotation speed responsive type.

As is understood from the above description, it is desirable that in the operation of FIG. 10, the driver's steering effort is controlled as shown by a solid line in FIG. 12, and it is also desirable that in the operation of FIG. 11, the driver's steering effort is controlled as shown by a dot and dash line in FIG. 12. However, in use of the conventional power-assisted steering system of the vehicle speed responsive type, the driver's steering effort in the operation of FIG. 10 will be controlled as shown by a solid line in FIG. 14. This means that when the vehicle is operated by the skilled driver, the driver's steering effort is excessively decreased at the region of points C-F to cause an unstable turning maneuver. In use of the conventional power-assisted steering system of the engine rotation responsive type, the driver's steering effort in the operation of FIG. 10 will be controlled as shown by a solid line in FIG. 15 or FIG. 16. This means that the driver's steering effort is excessively decreased at the regions of A-C and F-G or the regions of B-C and F-G to cause unstable turning maneuver.

SUMMARY OF THE INVENTION

It is, therefore, a primary object of the present invention to provide an electric control apparatus for the power-assisted steering system capable of controlling the driver's steering effort in response to operation of the driver during cornering travel of the vehicle, of lightening the driver's steering effort in response to the vehicle speed during straight travel of the vehicle at a medium or low speed, and of weighting the driver's steering effort during high speed travel of the vehicle for stability in turning maneuver.

According to the present invention, there is provided an electric control apparatus for a power-assisted steering system in a wheeled vehicle including a steering shaft arranged to be rotated by the driver's steering effort applied thereto; a hydraulic power cylinder having a power piston mounted for reciprocating movement in the cylinder and operatively connected to driven members of the steering system; a servo valve associated with the power cylinder to interconnect a hydraulic pressure source and the cylinder and being responsive to rotary motion of the steering shaft for selectively directing the flow of fluid under pressure from the pressure source to one of opposite fluid chambers of the cylinder and permitting the flow of fluid from the other fluid chamber to a fluid reservoir to effect reciprocating movement of the power piston; and an electrically operated bypass valve disposed within a bypass passage for permitting bypass flow of fluid passing therethrough between the pressure source and the reservoir in its energized condition. The electric control apparatus comprises first detecting means for detecting a travel speed of the vehicle to produce a first electric signal indicative of the vehicle speed; second detecting means for detecting a rotation speed of a prime mover of the vehicle to produce a second electric signal indicative of the rotation speed of the prime mover; means responsive to the first and second electric signals for determining an optimum steering effort in relation to each value of the electric signals on a basis of predetermined respective functions of the vehicle speed and the rotation speed of the prime mover and for producing an electric control signal indicative of the optimum steering effort; and means for applying the electric control signal to the bypass valve to control the opening degree of the bypass valve in accordance with the value of the electric control signal.

BRIEF DESCRIPTION OF THE DRAWINGS

Additional objects and advantages of the present invention will become readily apparent from the following detailed description of a preferred embodiment thereof when considered with reference to the accompanying drawings, in which.

DETAILED DESCRIPTION OF THE PREFERRED EMBODIMENT

Figure 1:
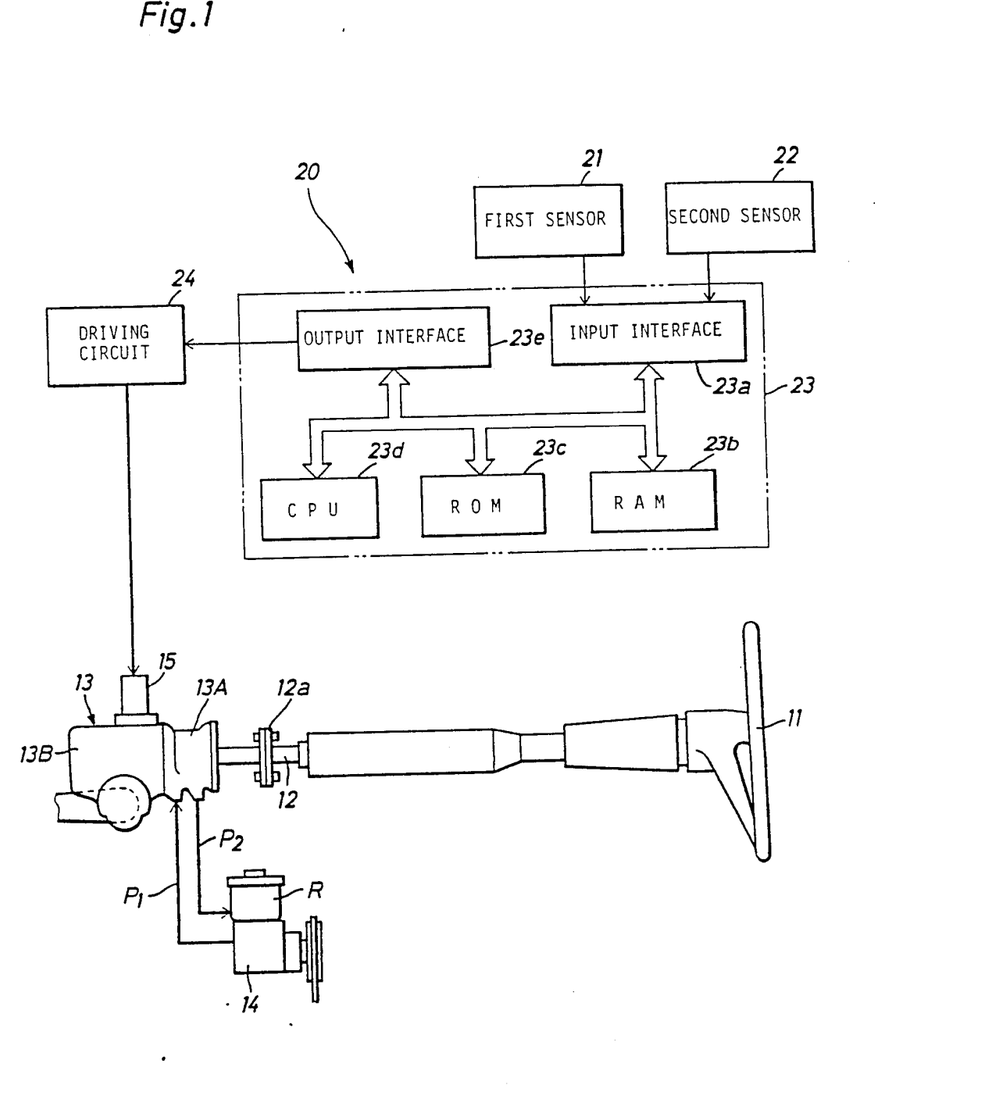
FIG. 1 is a schematic block diagram of an electric control apparatus for a power-assisted steering system in accordance with the present invention.

Referring now to the drawings, FIG. 1 illustrates a power-assisted steering system for a wheeled vehicle which comprises a servo valve 13A, a hydraulic power cylinder 13B, and a source of fluid under pressure in the form of a fluid pump 14 driven by a prime mover of the vehicle. The servo valve 13A is associated with the hydraulic power cylinder 13B in a common cylinder housing 13 to interconnect the power cylinder 13B and the fluid pump 14 therethrough and is operatively connected through a flexible coupling 12a to a steering shaft 12 which is arranged to be rotated by the driver's steering sffort applied to a steering wheel 11. The servo valve 13A has an inlet port connected to the fluid pump 14 by way of a hydraulic pressure conduit $P_1$ and an exhaust port connected to a fluid reservoir R of the pump 14 by way of an exhaust conduit $P_2$. The hydraulic power cylinder 13B includes a power piston mounted for reciprocating movement in the cylinder and operatively connected in a usual manner to steerable road-engaging wheels of the vehicle by way of a steering linkage (not shown).

In the power-assisted steering sytem, an electrically operated bypass valve 15 in the form of a linear solenoid valve is mounted on the power cylinder housing and disposed within a bypass passage between the opposite fluid chambers of hydraulic power cylinder 13B to permit bypass flow of fluid passing therethrough from the fluid pump 14 to the reservoir R in its energized condition. Alternatively, the bypass valve 15 may be disposed within a bypass passage between the hydraulic pressure conduit $P_1$ and the exhaust conduit $P_2$. In such an arrangement, the bypass valve 15 acts to normally close the bypass passage in its deenergized condition and to open the bypass passage when energized by an electric control signal from an electric control apparatus 20 in accordance with the present invention.

In operation of the power-assisted steering system, the fluid pump 14 is driven by start of the prime mover to supply fluid under pressure to the servo valve 13A through the hydraulic pressure conduit $P_1$. When the rotational speed of the prime mover reaches a predetermined speed, the quantity of fluid under pressure discharged from pump 14 increases to effect a sufficient hydraulic power assist. When the steering wheel 11 is rotated by the driver's steering effort applied thereto, the servo valve 13A is operated in response to rotary motion of the steering wheel 11 to selectively direct the flow of fluid under pressure from the pump 14 to one of opposite fluid chambers of the power cylinder 13B and to permit the flow of fluid from the other fluid chamber to the fluid reservoir R thereby to effect reciprocating movement of the power piston. Thus, the hydraulic power cylinder 13B is operated to effect a hydraulic power assist to the driver's steering effort.

In such operation as described above, the hydraulic power assist is maintained at a maximum value when the bypass valve 15 is maintained in its deenergized condition to close the bypass passage. Thus, the driver's steering effort is minimized when the maximum hydraulic power assist is performed. When the bypass valve 15 is energized to open the bypass passage, the pressure in the high pressure chamber of power cylinder 13B is decreased in accordance with the degree of opening of bypass valve 15 to decrease the hydraulic assist power. Thus, the driver's steering effort is weighted in accordance with the amount of decrease of the hydraulic power assist.

Hereinafter, the electric control apparatus 20 for the power-assisted steering system will be described in detail. The electric control apparatus 20 comprises a first speed sensor 21 arranged to detect the rotation speed of an output shaft of a power transmission of the vehicle for producing a first electric signal indicative of the vehicle speed, a second speed sensor 22 arranged to detect the rotation speed of an output shaft of the prime mover for producing a second electric signal indicative of the detected rotation speed of the prime mover, a microcomputer 23 arranged to be applied with the first and second electric signals from sensors 21 and 22, and a driving circuit 24 arranged to be activated by an output signal from computer 23.

The computer 23 includes an input interface 23a, a random access memory or RAM 23b, a read only memory or ROM 23c, a central processing unit or CPU 23d, and an output interface 23e which are connected to each other by way of a common bus line. The input interface 23a is arranged to be applied with the first and second electric signals from sensors 21 and 22, and the RAM 23b is arranged to temporarily memorize each value of the first and second electric signals. The ROM 23c is arranged to previously store a program shown in FIG. 2, and the CPU 23d is arranged to execute the program in response to the first and second electric signals thereby to produce an output signal indicative of a control value determined by execution of the program. The driving circuit 24 is applied with the output signal from the CPU 23 through the output interface 23e to produce an electric control signal indicative of the control value. Thus, the bypass valve 15 in the power-assisted steering system is energized by the electric control signal from driving circuit 24 to open the bypass passage in accordance with the value of the electric control signal.

Figure 2:
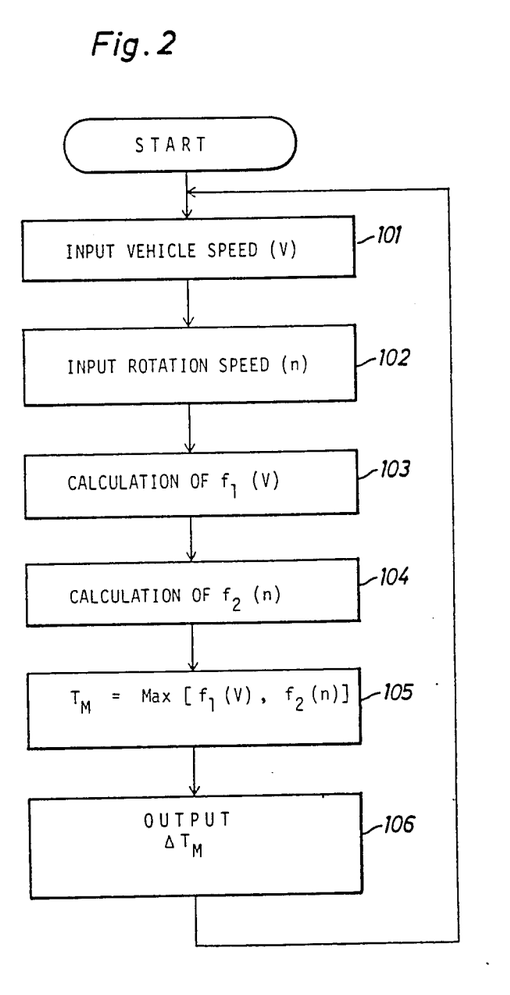
FIG. 2 is a flow chart illustrating a program executed by a microcomputer shown in FIG. 1.
Figure 7A:
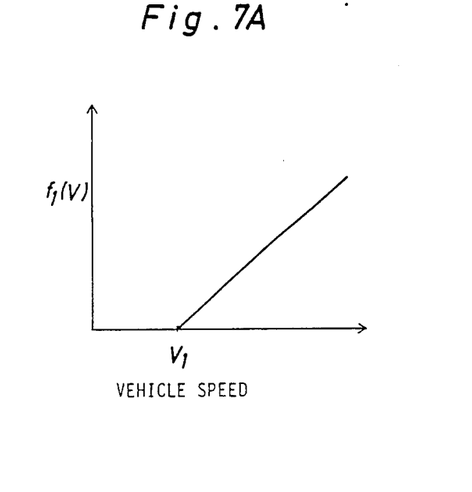
FIGS. 7A and 8A each illustrate a function in relation to a vehicle speed.
Figure 7B:
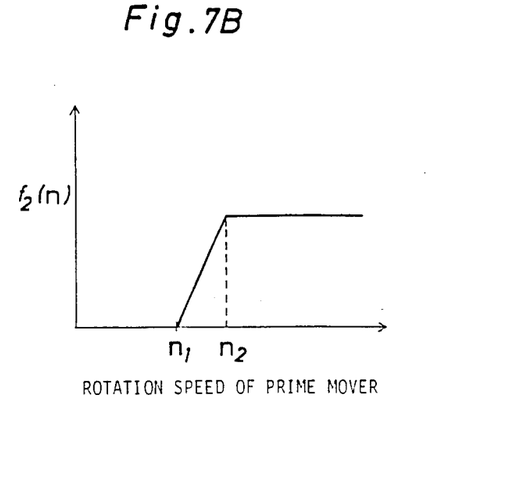
FIGS. 7B and 8B each illustrate a function in relation a rotation speed of a prime mover.
Figure 8A:
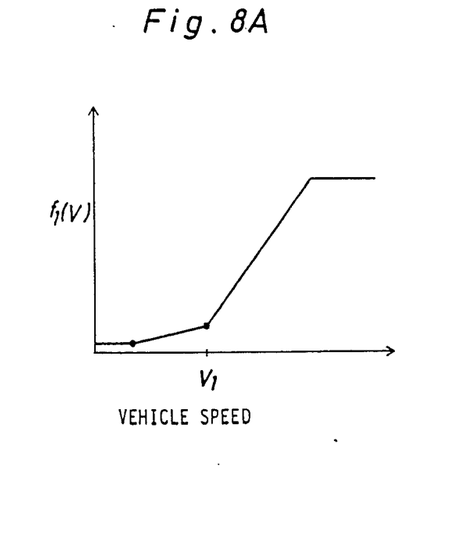
Figure 8B:
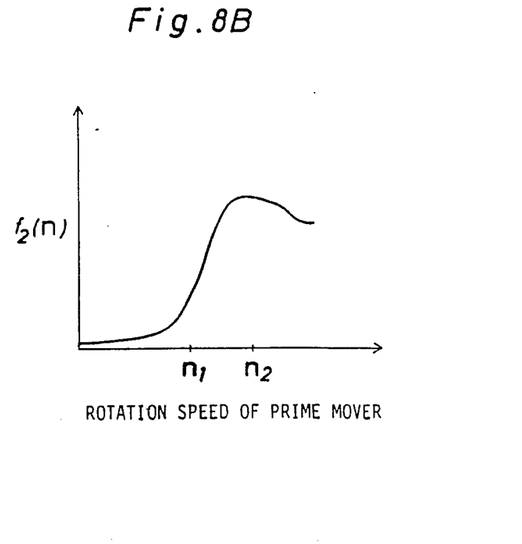

In operation of the electric control apparatus 20, the program of FIG. 2 is initialized when an ignition switch of the vehicle is actuated to start the prime mover, and subsequently at a step 101 of the program, the CPU 23d of computer 23 is applied with a first electric signal from sensor 21 through the input interface 23a to calculate a vehicle speed V. Successively, at a step 102 of the program, the CPU 23d of computer 23 is applied with second electric signal from sensor 22 through the input interface 23a to calculate a rotation speed n of the prime mover. The calculated vehicle speed V and rotation speed n are temporarily memorized in the RAM 23b. When the program proceeds to a step 103, the CPU 23d reads out the vehicle speed V from the RAM 23b to calculate a function $f_1(V)$ in relation to the memorized vehicle speed V, and subsequently at a step 104 of the program, the CPU 23d reads out the rotation speed n from the RAM 23b to calculate of a function $f_2(n)$ in relation to the memorized rotation speed n. In this case, the function $f_1(V)$ is defined as shown in FIG. 7A or 8A, wherein an optimum steering effort is determined in accordance with the vehicle speed (V), and the function $f_2(n)$ is defined as shown in FIG. 7B or 8B, wherein an optimum teering effort is determined in accordance with the rotation speed (n) of the prime mover. In FIGS. 7A and 8A, a limited vehicle speed in the streets is indicated at $V_1$. In FIGS. 7B and 8B, the rotation speeds of the prime mover, 2000 r.p.m. and 3000 r.p.m. are indicated at $n_1$ and $n_2$, respectively.

When the program proceeds to a step 105 in FIG. 2, the CPU 23d executes calculation of the following equation to determine an optimum steering effort $\Delta T_M$ based on the calculated functions $f_1(V)$ and $f_2(n)$, and subsequently at a final step 106 of the program, the CPU 23d produces an output signal indicative of the optimum steering effort $\Delta T_M$. Thus, the driving circuit 24 is applied with the output signal from the CPU 23d through the output interface 23e to produce therefrom an electric control signal indicative of the optimum steering effort $\Delta T_M$.

$$\Delta T_M = \text{Max}[f_1(V), f_2(n)]$$

When the function $f_1(V)$ is larger than or equal to the function $f_2(n)$ in claculation of the equation at step 105 of the program, the optimum steering effort $\Delta T_M$ is determined by the former value. When the function $f_1(V)$ is smaller than the function $f_2(n)$, the optimum steering effort $\Delta T_M$ is determined by the latter value. Thus, the bypass valve 15 is energized by the electric control signal applied thereto from the driving circuit 24 to control the opening degree of the bypass passage in accordance with the value of the electric control signal to thereby to control the hydraulic power assist to the driver's steering effort to be an optimum value.

Figure 13:
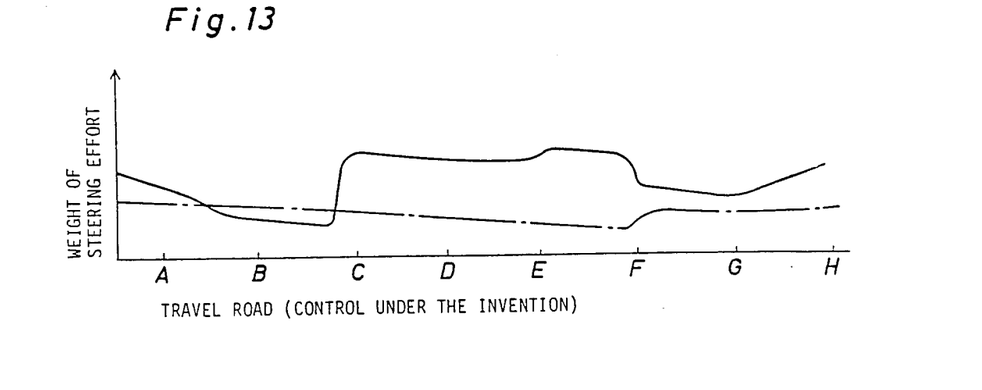
FIG. 13 is a graph illustrating a control of the driver's steering effort under the present invention.

From the above description, it will be understood that during low or medium speed travel of the vehicle in the streets, the bypass valve 15 is maintained in its deenergized condition or energized to slightly open the bypass passage to lighten the driver's steering effort. Furthermore, during cornering travel of the vehicle at a high speed, the driver's steering effort is controlled in response to deceleration of the vehicle and shifting operation of the power transmission as is illustrated in FIG. 13.

Figure 3:
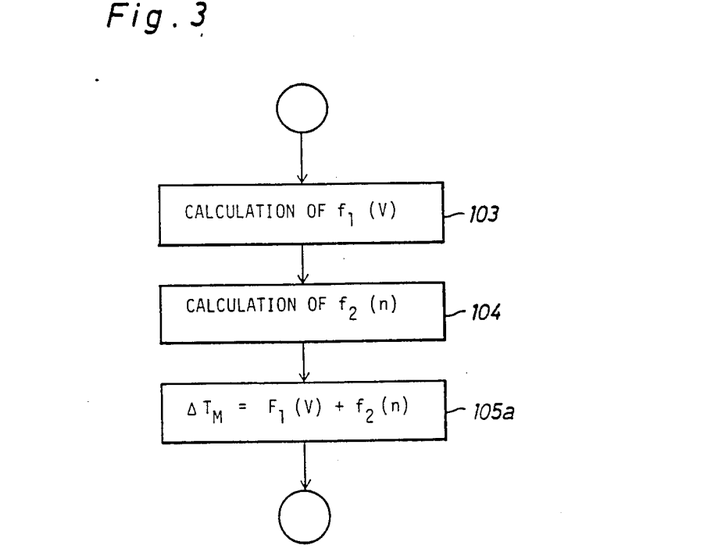
FIGS. 3–5 illustrate modifications of the flow chart shown in FIG. 2.
Figure 4:
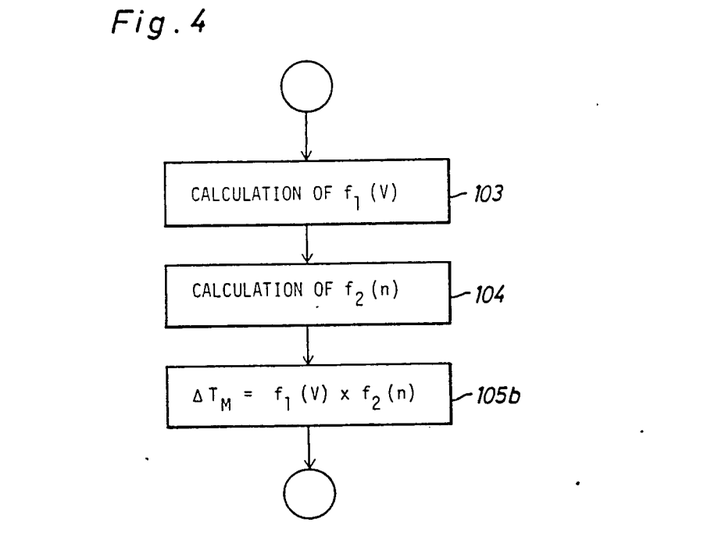
Figure 5:
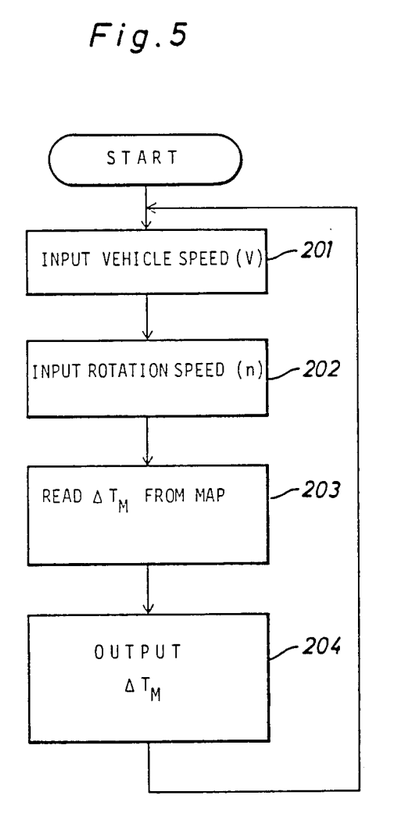
Figure 6:
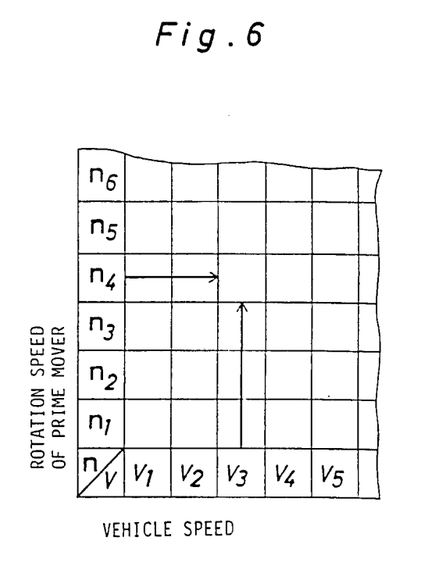
FIG. 6 illustrates a map adapted to execution of the proram of FIG. 5.

In the actual practice of the present invention, the above-described equation $\Delta T_M = \text{Max}[f_1(V), f_2(n)]$ may be replaced with an equation $\Delta T_M = f_1(V) + f_2(n)$ as indicated at a step 105a of FIG. 3. Alternatively, the above-described equation may be replaced with an equation $\Delta T_M = f_1(V) \times f_2(n)$ as indicated at a step 105b of FIG. 4. Furthermore, as shown in FIG. 6, a map may be adapted to determined an optimum steering effort $\Delta T_M$ in relation to the vehicle speed (V) and the rotation speed (n) of the prime mover. In this case, the program of FIG. 2 is modified as shown in FIG. 5, wherein the vehicle speed (V) and the rotation speed (n) of the prime mover are successively read out at steps 201 and 202, and an optimum steering effort $\Delta T_M$ is determined by the map of FIG. 6 at a step 203 to produce an output signal indicative of the optimum steering effort $\Delta T_M$ at a step 204.

Having now fully set forth both structure and operation of the preferred embodiment of the concept underlying the present invention, various other embodiments as well as certain modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An electric control apparatus for a power-assisted steering system in a wheeled vehicle including a steering shaft arranged to be rotated by a driver's steering effort applied thereto; a hydraulic power cylinder having a power piston mounted for reciprocating movement in said cylinder and operatively connected to driven members of the steering system; a servo valve interconnecting a hydraulic pressure source and said cylinder and being responsive to rotary motion of said steering shaft for selectively directing the flow of fluid under pressure from said pressure source to one of opposite fluid chambers of said cylinder and permitting the flow of fluid from the other fluid chamber to a fluid reservoir to effect reciprocating movement of said power piston; and an electrically operated bypass valve disposed within a bypass passage for permitting bypass flow of fluid passing therethrough between said pressure source and said reservoir in its energized condition; the electric control apparatus comprising:

first detecting means for detecting a travel speed of the vehicle to produce a first electric signal indicative thereof;

second detecting means for detecting a rotation speed of a prime mover of the vehicle to produce a second electric signal indicative thereof;

means responsive to said first and second electric signals for determining an optimum steering effort amount based on predetermined respective functions of both of the vehicle speed and the rotation speed of the prime mover, and for producing an electric control signal indicative of such optimum steering effort; and means for applying said electric control signal to said bypass valve to control the opening degree thereof in accordance with the value of said electric control signal.

2. An electric control apparatus as claimed in claim 1, wherein said means responsive to said first and second electric signals is also for calculating a solution to an equation $\Delta T_M = Max$ *in relation to each value of said electric signals, so that when the function* $f_1(V)$ is larger than or equal to the function $f_2(n)$, an optimum steering effort $\Delta T_M$ is determined by the former value and that when the function $f_1(V)$ is smaller than the function $f_2(n)$, the optimum steering effort $\Delta T_M$ is determined by the latter value.

3. An electric control apparatus as claimed in claim 1, wherein said means responsive to said first and second electric signals is also for calculating a solution to an equation $\Delta T_M = f_1(V) + f_2(n)$ in relation to each value of said electric signals so that an optimum steering effort $\Delta T_M$ is determined by a sum of the calculated functions $f_1(V)$ and $f_2(n)$.

4. An electric control apparatus as claimed in claim 1, wherein said means responsive to said first and second electric signals is also for calculating a solution to an equation $\Delta T_M = f_1(V) \times f_2(n)$ in relation to each value of said electric signals so that an optimum steering effort $\Delta T_M$ is determined by a multiplied value of the calculated functions $f_1(V)$ and $f_2(n)$.

5. An electric control apparatus as claimed in claim 1, further comprising a map, and wherein said means responsive to said first and second electric signals is also for determining optimum steering effort $\Delta T_M$ in relation to each value of said electric based on said map where the optimum steering effort $\Delta T_M$ is previously defined in relation to the vehicle speed and the rotation speed of the prime mover.

6. An electric control apparatus for a power-assisted steering system in a wheeled vehicle driven by an engine, comprising:

first detecting means for detecting a travel speed of the vehicle to produce a first signal indicative thereof;

second detecting means for detecting a rotation speed of the engine of the vehicle to produce a second signal indicative thereof;

means responsive to said first and second electric signals for determining an optimum steering effort amount based on predetermined respective functions of both of the vehicle speed and the rotation speed of the engine, said functions related to at least one of transmission gear, acceleration, and deceleration condition therefrom, and for producing a control signal indicative of such optimum steering effort; and bypass valve means for controlling an amount of power assist produced by said system based on said control signal.

7. A method for controlling a power-assisted steering system in a wheeled vehicle driven by an engine, comprising the steps of:

detecting a travel speed of the vehicle and producing a first signal indicative thereof;

detecting a rotation speed of the engine of the vehicle and producing a second signal indicative thereof;

determining an optimum steering effort amount based on predetermined respective functions of both of the vehicle speed and the rotation speed of the engine, producing an electric control signal indicative of such optimum steering effort; and controlling an amount of power assist produced by said system based on said electric control signal.

* * * * *